United States Patent [19]

Watt

[11] 4,443,510
[45] Apr. 17, 1984

[54] CONFORMABLE REMOVABLE REFLECTIVE MARKING TAPE

[75] Inventor: Charles W. Watt, Webster Groves, Mo.

[73] Assignee: Lukens General Industries, Inc., St. Louis, Mo.

[21] Appl. No.: 421,871

[22] Filed: Sep. 23, 1982

[51] Int. Cl.³ .......................... B32B 5/02; G02B 5/136
[52] U.S. Cl. ........................................ 428/149; 404/14; 428/219; 428/280; 428/325; 428/332; 428/354
[58] Field of Search ................. 404/14; 428/215, 281, 428/325, 354, 461, 149, 219, 280, 332

[56] References Cited

U.S. PATENT DOCUMENTS 2,407,680  9/1946  Palmquist et al. ................... 404/14
3,946,130  3/1976  Tung et al. ........................ 428/325
4,248,932  2/1981  Tung et al. ........................ 428/325
4,299,874  11/1981 Jones et al. ....................... 428/325

FOREIGN PATENT DOCUMENTS 559261  2/1944  United Kingdom ............... 428/325

Primary Examiner—George F. Lesmes
Assistant Examiner—William M. Atkinson
Attorney, Agent, or Firm—Rogers, Eilers & Howell

[57] ABSTRACT

A multilayer reflective tape for use on roadways to provide temporary marking and demarcation of traffic lanes is disclosed. The tape has a thin malleable strip of aluminum, the top of which is coated with a high visibility paint in which reflective glass beads are embedded. Bonded to the bottom of the aluminum strip is a nylon felt scrim, the bottom of which is provided with a pressure-sensitive adhesive.

2 Claims, 2 Drawing Figures

"CONFORMABLE REMOVABLE REFLECTIVE MARKING TAPE"

BACKGROUND OF THE INVENTION

This invention relates to marking tapes for use on roadways to provide temporary marking and demarcation of traffic lanes. More specifically, this invention relates to removable marking tapes of high visibility and reflectivity having a long service life.

Temporary roadway marking tapes are known in the prior art, but have presented several problems. The most apparent and serious problem has been the difficulty of providing a tape that can withstand the substantial shear stresses applied by vehicle wheels. These stresses often cause the tapes to slide on the roadway, thereby detaching the tape. These stresses can also cause tearing, ripping and wrinkling of the tape.

A related problem is that a tape of sufficient adhesion to resist dislocation and damage is extremely difficult to remove when the location of the marker is to be changed. Prior tapes often tended to come off in bits and pieces instead of in the long strips in which they were applied. This was especially true of the metal-based tapes in the prior art, which although more resistant to wear, were nearly impossible to remove.

Yet another problem is that to resist the tearing and ripping caused by the stresses applied, the tape had to be thick. This thickness caused the tape to protrude from the roadway, subjecting it to even greater stresses as well as increased abrasion. The thickness also added to the weight and bulk of the tape, causing inconvenience in the shipping, storing, and handling of the tape.

SUMMARY OF THE INVENTION

It is therefore an object of this invention to provide a removable, reflective marking tape that solves these problems.

More specifically, it is an object of this invention to provide a removable, reflective, multilayer marking tape based on a thin, malleable sheet of aluminum. The top surface of the aluminum is covered with a pigmented vinyl binder. High index glass beads are embedded in the vinyl binder. A scrim of polymer felt is bonded to the bottom side of the aluminum sheet with an adhesive. The adhesive soaks into and saturates the scrim, forming a composite backing. Finally, a pressure-sensitive adhesive is applied to the bottom of the scrim.

The resultant tape solves the many problems of the prior art. The aluminum base is strong and lightweight. It provides improved tear resistance over the polymer-layered tapes of the prior art. Furthermore, the aluminum is malleable so the tape will conform to the road surface. While the polymer scrim has some memory, the entire tape has a very low system memory and thus will conform to the shape of the road and not spring back or "remember" its original configuration as was the case with the polymer-based tapes of the prior art.

Another advantage of the aluminum backing is aluminum's superior resistance to shrinkage, weathering, and embrittlement at low temperatures. Unlike the polymers used in the prior art, aluminum is unaffected by sunlight and petrochemicals present in the roadway environment. Aluminum also has a higher durability and wear resistance.

Another advantage of the aluminum is that it is impervious to water so that water cannot soak up behind the pigmented binder causing blistering and peeling of the pigmented binder.

Another advantage of the aluminum is that it provides superior strength and less volume and weight than the polymer tapes of the prior art. Thus a given length of this tape requires less space and weighs less than those of the prior art. This facilitates shipping, storing and handling of the tape.

Yet another advantage of the aluminum base is that when the tape is gouged so that the paint and beads are removed, the gouge exposes bare aluminum which in itself is reflective. Thus the reflectivity of the tape, although diminished, is not eliminated.

The composite backing of polymer, felt scrim and adhesive reinforces the aluminum to help it resist tearing, not just while in use, but also during removal. The scrim prevents the tape from tearing during removal and thereby allows the tape to be removed in the same long strips in which it was applied. This greatly reduces the labor, time and expense spent in removing the tape, and offers a significant improvement over the metal tapes of the prior art.

While adding strength, the scrim-adhesive composite does not add significant thickness to the tape. Thus the tape does not protrude very much from the roadway, reducing stress on the tape and increasing its useful life. Furthermore, thin tape offers advantages in storing, shipping and handling. Finally, the thinness of the scrim and its lack of compressibility reduce the flexing of the tape's surface, prolonging the life of the pigmented vinyl binder and glass beads affixed thereto.

The result of this combination is that the multilayered tape of this invention has an in-use life span of over six months, more than double that of any of the prior art tapes.

DESCRIPTION OF THE PREFERRED EMBODIMENT

Figure 1:
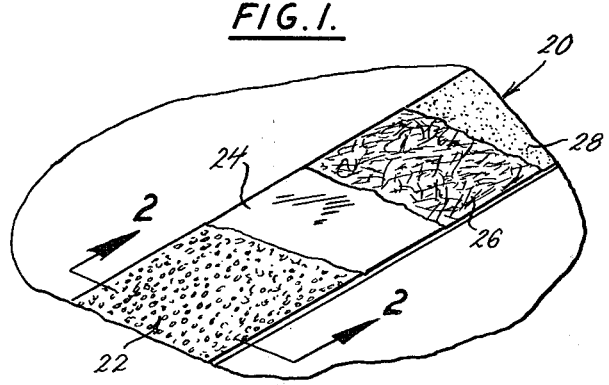
FIG. 1 is an orthogonal partial view exposing each layer of a section of tape constructed according to the principles of this invention.

Referring to the drawings, in FIG. 1 there is shown a section of tape constructed according to the principles of this invention indicated generally as 20. The tape is drawn to show four layers exposed. The reflective top layer 22 is composed of glass beads in a vinyl or other suitable equivalent polymer binder matrix. The base layer 24 is a thin malleable strip of aluminum. The backing layer 26 is a scrim of nylon felt bonded to the aluminum with an adhesive. An adhesive layer 28 is the bottom layer of the tape and is composed of a rubber-based adhesive, or other suitable equivalent.

Figure 2:
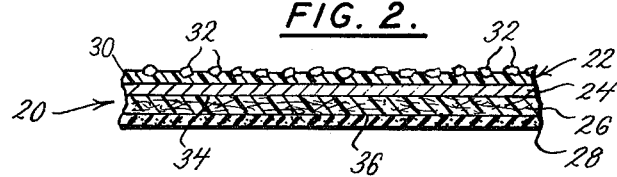
FIG. 2 is a cross sectional view of the tape taken along line 2—2 in FIG. 1.

Referring to the cross-sectional view in FIG. 2, the base layer 24 is a zero temper aluminum foil, about 0.0025 to 0.0035 inches thick±aluminum mill tolerances. Because of the thinness of the foil and its lack of temper, it will conform to the road surface, insuring better contact with the surface. The foil is sufficiently thick to substantially override any memory the polymer scrim may exhibit which would tend to lift the tape from the road surface. The aluminum further provides a waterproof backing to prevent the blistering of the reflective layer 22. The aluminum is also a reflective base, and if the reflecting layer 22 is scraped off, some degree of reflectivity will remain.

The reflective top layer 22 is formed from a layer of pigmented binder 30 applied to the aluminum. This binder can be of any appropriate color, but typically is either white or yellow. In the preferred embodiment, a suitable binder is either Union Carbide TiO₂ White VMCH or Chrome Yellow VYHH paint TM. Any suitably pigmented and durable equivalent coating may be used, however. A variety of paints suitable for outdoor usage on signs, markers and tapes are known to those skilled in the art. When dry the binder layer 30 is approximately 0.004 inches thick. Before the binder layer 30 dries, high index of refraction glass spheres 32 are embedded into the paint. In the preferred embodiment, the spheres 32 are 30–80 U.S. standard mesh (having diameters between 0.0234 to 0.0070 inches). The glass spheres are applied in a density of approximately 7½ pounds per 100 square feet of tape. The spheres have an index of refraction ranging approximately from 1.90 to 1.94.

The backing layer 26 is a scrim of nylon felt. In the preferred embodiment, one ounce Cerex nylon TM, available from Monsanto Corporation or DuPont Remay 2024(TM) may be used. Any other equivalent nylon or other equivalent felt may be used; satisfactory substitutes are known to those skilled in the art. The scrim is bonded to the aluminum with an adhesive. In the preferred embodiment, Midwest Adhesive 4-2 (TM) (solvent based vinyl) is applied to the lower surface 34 of the aluminum. Any other adhesive for bonding nylon to aluminum that is suitable for outdoor usage may be used. A wide variety of satisfactory substitute adhesives are known to those skilled in the art. A coat approximately 0.025 inches is applied. The scrim is applied and pressure rollers squeeze the scrim into the adhesive so that the scrim soaks up the adhesive and becomes saturated.

The adhesive/scrim layer 26 which is formed provides tear resistance to the aluminum foil base layer 24. Thus, without significant increases in volume or weight, the tape is made sufficiently sturdy to be removed without tearing. Thus substantial amounts of time, labor and money are saved in the removal process, and the tape marker is made truly temporary.

Finally, a rubber-based pressure-sensitive adhesive is applied to the bottom 36 of backing layer 26. In the preferred embodiment, this adhesive is Midwest Adhesive Grade 212-1021 TM. Any pressure sensitive adhesive suitable for outdoor usage may be used. A wide variety of satisfactory substitute adhesives are known to those skilled in the art. Adhesive is applied such that when dry, a layer about 0.0025 to 0.003 inches is formed.

Once fabricated, the tape can be rolled up for storage and shipment. The tape can then be applied on roadway surfaces by any means known in the art. The tape of this invention conforms to the road surface and remains in place. However, when it is desired to remove the temporary markings, the tape is readily removed without fragmentation and tearing because of the aluminum/polymer scrim combination.

Testing indicates that one application will last approximately six months under reasonably severe conditions such as a detour at a busy location with heavy traffic. This means for the average temporary use, only one application of tape is needed to safely mark lanes around construction sites, hazards, and the like.

There are various changes and modifications which may be made to applicant's invention as would be apparent to those skilled in the art. However, any of those changes or modifications are included in the teaching of applicant's disclosure and he intends that his invention be limited only by the scope of the claims appended hereto.

What I claim is:

1. A thin conformable, removable, reflective marking tape comprising:
   a base layer of zero temper aluminum foil approximately 0.0025 to 0.0035 inches thick;
   a layer of vinyl pigmented binder on the top surface of said foil;
   glass beads, 30–80 U.S. standard mesh, (0.0234 to 0.0070 inches in diameter), having an index of refraction ranging approximately from 1.90 to 1.94, embedded in said binder;
   a scrim layer of resilient nylon felt on the bottom surface of said foil;
   a pressure sensitive adhesive layer on the bottom surface of said scrim;
   said scrim being bonded to said foil by the application of the adhesive to the bottom of the said foil, and said scrim being saturated by said adhesive;
   said nylon scrim having a memory tending to return the scrim to its original dimensions when stretched to conform to a surface;
   said nylon scrim further being sufficiently thin such that flexing of the aluminum base layer is minimized to prolong the life of the vinyl pigmented binder and glass beads on the top surface thereof;
   said aluminum layer being sufficiently thin to conform to the roadway surface, but thick enough to override the memory of the nylon scrim, the marking tape, thereby, having substantially no memory and forming a tight, removable, surface conforming structure when applied to a roadway or the like.

2. The marking tape of claim 1 wherein the high index glass beads are applied at approximately 7.5 pounds per 100 square feet of tape.

* * * * *